United States Patent
Chou

(10) Patent No.: US 11,063,844 B2
(45) Date of Patent: Jul. 13, 2021

(54) SYSTEMS, METHODS AND DEVICES FOR VIRTUAL RESOURCE METRIC MANAGEMENT

(71) Applicant: Apple Inc., Cupertino, CA (US)

(72) Inventor: Joey Chou, Scottsdale, AZ (US)

(73) Assignee: APPLE INC., Cupertino, CA (US)

( * ) Notice: Subject to any disclaimer, the term of this patent is extended or adjusted under 35 U.S.C. 154(b) by 42 days.

(21) Appl. No.: 16/476,011

(22) PCT Filed: Feb. 5, 2018

(86) PCT No.: PCT/US2018/016806
§ 371 (c)(1),
(2) Date: Jul. 3, 2019

(87) PCT Pub. No.: WO2018/148135
PCT Pub. Date: Aug. 16, 2018

(65) Prior Publication Data
US 2019/0349272 A1    Nov. 14, 2019

Related U.S. Application Data

(60) Provisional application No. 62/457,591, filed on Feb. 10, 2017.

(51) Int. Cl.
*H04L 12/26*    (2006.01)
*G06F 9/455*    (2018.01)
*H04L 12/24*    (2006.01)

(52) U.S. Cl.
CPC .......... *H04L 43/04* (2013.01); *G06F 9/45558* (2013.01); *H04L 41/046* (2013.01); *H04L 43/06* (2013.01); *G06F 2009/45595* (2013.01)

(58) Field of Classification Search
CPC ... G06F 2009/455095; G06F 9/455585; H04L 12/26; H04L 41/046; H04L 43/04; H04L 43/06; H04L 43/0817
See application file for complete search history.

(56) References Cited

U.S. PATENT DOCUMENTS 8,996,695 B2* 3/2015 Anderson ........... G06F 11/3089
709/224
9,497,139 B2* 11/2016 Klein ...................... H04L 29/08
(Continued)

OTHER PUBLICATIONS

ETSI GS NFV-IFA 027 , "Network Functions Virtualization (NFV); Management and Orchestration; Performance Measurements Specification", V0.8.0, Dec. 2017, 30 pages.
(Continued)

*Primary Examiner* — Sargon N Nano
(74) *Attorney, Agent, or Firm* — Stoel Rives LLP

(57) ABSTRACT

Resource usage data of a virtual machine (VM) instance is collected by an agent to be delivered to the network function virtualization infrastructure (NFVI) for conversion to virtual resource usage metrics to be provided to a virtualized infrastructure manager (VIM) for transmission of a virtual resource usage measurement to a virtualized network function manager (VNFM). For example, an agent executing on a compute node receives virtual resource data from a compute node hypervisor. The agent provides the virtual resource data to the NFVI. The NFVI converts the virtual resource data to virtual resource usage metrics using a publishing pipeline. The NFVI uses the publishing pipeline to report the virtual resource usage metrics to a virtualized infrastructure manager. The VIM uses the data to provide virtual resource usage measurements to a virtualized network function manager (VNFM).

20 Claims, 10 Drawing Sheets

(56) References Cited

U.S. PATENT DOCUMENTS

| | | | |
|---|---|---|---|
| 9,547,534 B2* | 1/2017 | Dettori | G06F 9/5072 |
| 9,720,989 B2* | 8/2017 | Theimer | G06F 16/258 |
| 9,866,435 B2* | 1/2018 | Amato | H04L 67/10 |
| 9,936,047 B2* | 4/2018 | Adolph | H04L 41/5051 |
| 9,979,602 B1* | 5/2018 | Chinnakannan | H04L 47/82 |
| 10,055,239 B2* | 8/2018 | Adogla | G06F 11/3409 |
| 10,298,439 B2* | 5/2019 | Zhu | H04L 41/20 |
| 10,365,934 B1* | 7/2019 | Madan | G06F 9/455 |
| 10,481,935 B2* | 11/2019 | Iwashina | G06F 9/45558 |
| 2015/0281113 A1* | 10/2015 | Siciliano | H04L 43/0817 709/226 |
| 2016/0154663 A1* | 6/2016 | Guthrie | G06F 11/1458 718/1 |
| 2016/0205004 A1* | 7/2016 | Chou | H04L 41/0896 709/224 |
| 2019/0312800 A1* | 10/2019 | Schibler | G06F 8/65 |
| 2019/0349272 A1* | 11/2019 | Chou | H04L 41/046 |
| 2019/0354675 A1* | 11/2019 | Gan | G06F 9/45558 |

OTHER PUBLICATIONS

ETSI GS NFV-TST008, "Network Functions Virtualisation (NFV); Testing; NFVI Compute and Network Metrics Specification", V0.0.3, Jan. 2017, 14 pages.

Intel Corporation (UK) Ltd., "Virtual CPU performance measurements", ETSI Draft; NFVIFA(16)0001460R1, European Telecommunications Standards Institute (ETSI), 650, Route Des Lucioles; F-06921 Sophia-Antipolis, France, vol. WG—NFV IFA—Interfaces and Architecture, Dec. 12, 2016, 8 pages.

PCT/US2018/016806, International Search Report and Written Opinion, dated May 9, 2018, 16 pages.

* cited by examiner

Collection and publishing of virtualized resources metrics

SYSTEMS, METHODS AND DEVICES FOR VIRTUAL RESOURCE METRIC MANAGEMENT

RELATED APPLICATION

This application claims the benefit under 35 U.S.C. § 119(e) of U.S. Provisional Application No. 62/457,591, filed Feb. 10, 2017, which is hereby incorporated by reference herein in its entirety.

TECHNICAL FIELD

The present disclosure relates to cellular communications and more specifically to virtual resource metric management in a network function virtualization infrastructure (NFVI).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable resource usage data of a virtual machine (VM) instance collected by an agent to be delivered to the network function virtualization infrastructure (NFVI) for conversion to virtual resource usage metrics to be provided to a virtualized infrastructure manager (VIM) for transmission of a virtual resource usage measurement to a virtualized network function manager (VNFM). For example, an agent executing on a compute node receives virtual resource data from a compute node hypervisor. The agent provides the virtual resource data to the NFVI. The NFVI converts the virtual resource data to virtual resource usage metrics using a publishing pipeline. The NFVI uses the publishing pipeline to report the virtual resource usage metrics to a VIM. The VIM uses the data to provide virtual resource usage measurements to a VNFM.

In some embodiments, virtualized can be spelled as "virtualised"; however, the meaning is the same.

In some embodiments, an OpenStack Telemetry service is used to collect the virtual central processing unit (CPU), storage, and networking metrics associated with the VM instances from the hypervisor. The OpenStack Telemetry service was originally designed to support billing systems for OpenStack cloud resources. In the embodiments, Telemetry collects metrics by polling the infrastructure elements and also by consuming the notifications emitted by other OpenStack services. A list of metrics collected by Telemetry includes virtualized resources metrics (e.g., virtual CPU/memory usage data, networking data volumes) that can be used in an auto-scaling feature in the Orchestration service.

Telemetry can use the following meter types: Cumulative and Gauge. A Cumulative meter type counts a number of events in an interval (e.g., networking bytes or packets). A Gauge meter type measures discrete events with fluctuating values in an interval (e.g., vCPU, memory, or disk usage).

Figure 1:
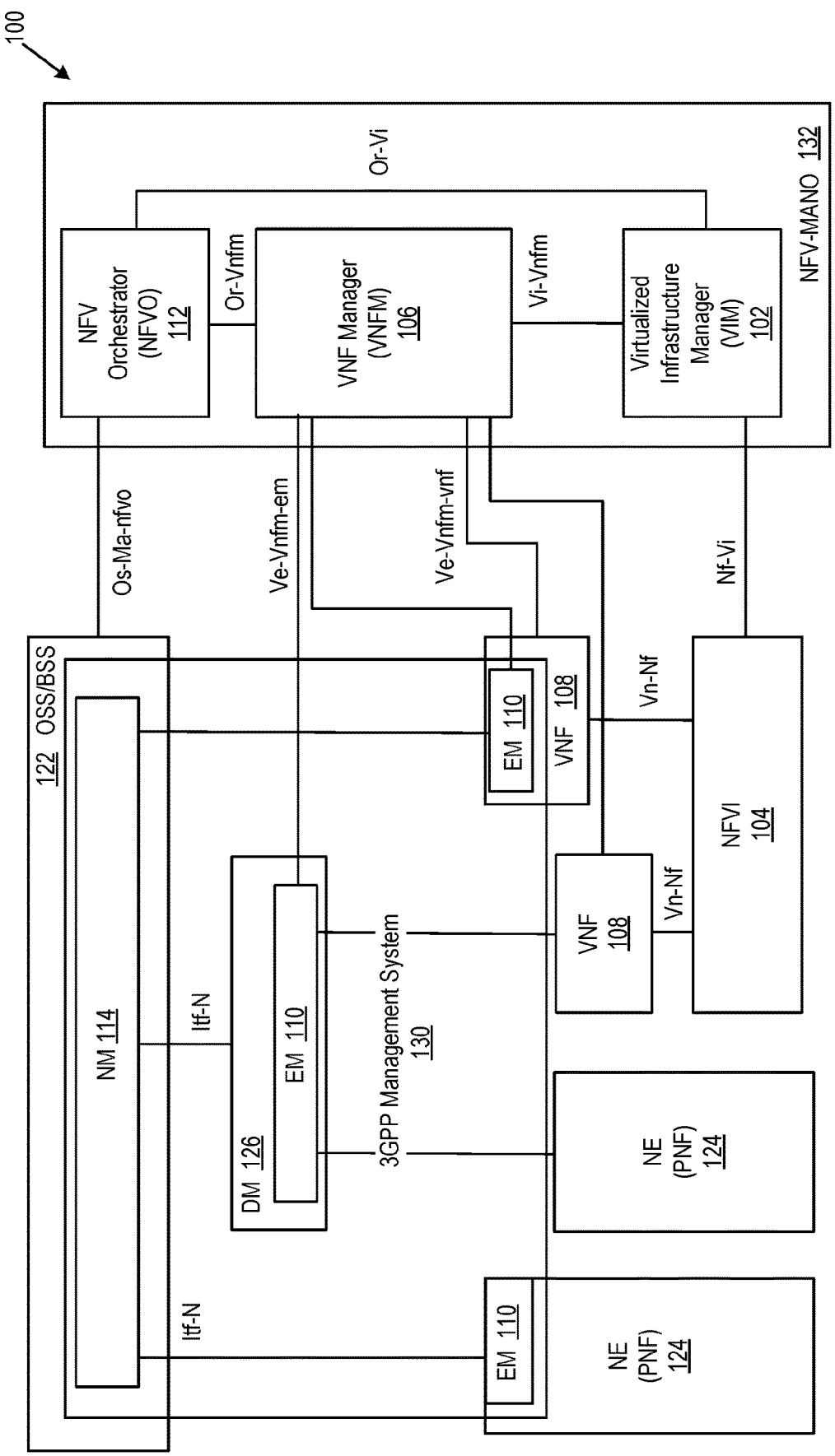
FIG. 1 is a diagram illustrating a network management architecture for virtualized network functions or network function virtualization according to certain embodiments.

FIG. 1 is a diagram illustrating a network management architecture 100 for virtualized network functions (VNFs or network function virtualization (NFV) more generally). The illustrated network management architecture 100 is provided by way of example only, and skilled persons will recognize from the disclosure herein that the described embodiments may also be used with other virtualized network architectures. The components shown in FIG. 1, according to some example embodiments, can support NFV. The architecture 100 is illustrated as including a virtualized infrastructure manager (VIM) 102, a network function virtualization infrastructure (NFVI) 104, a VNF manager (VNFM) 106, virtualized network functions (VNFs) 108, an element manager (EM) 110, an NFV orchestrator (NFVO) 112, and a network manager (NM) 114 within an operation support system/business support system (OSS/BSS) 122.

The VIM 102 manages the resources of the NFVI 104. The NFVI 104 can include physical or virtual resources and applications (including hypervisors) used to execute the architecture 100. The VIM 102 may manage the life cycle of virtual resources with the NFVI 104 (e.g., creation, maintenance, and tear-down of virtual machines (VMs) associated with one or more physical resources); track VM instances; track performance, fault and security of VM instances and associated physical resources; and expose VM instances and associated physical resources to other management systems.

The VNFM 106 may manage the VNFs 108. The VNFs 108 may be used to execute IP multimedia subsystem (IMS), evolved packet core (EPC) and 5G (5GC and NG-RAN) components/functions. The VNFM 106 may manage the life cycle of the VNFs 108 and track performance, fault and security of the virtual aspects of the VNFs 108. The EM 110 may track the performance, fault and security of the application aspects of the VNFs 108 and physical network functions (PNFs) 124. The tracking data from the VNFM 106 and the EM 110 may comprise, for example, performance measurement (PM) data used by the VIM 102 or the NFVI 104. Both the VNFM 106 and the EM 110 can scale in/out the quantity of the VNFs 108 of the architecture 100. In some embodiments, the EM 110 is responsible for fault, configuration, accounting, performance and security management (FCAPS). In other embodiments, the EM 110 can manage multiple VNFs 108, or multiple EMs 110 can manage a single VNF 108 each. In an embodiment, the EM 110 can be a VNF 108 itself. In an embodiment, the combination of the NM 114, a domain manager (DM) 126 and/or the EM 110 is considered to be a third generation partnership project (3GPP) management system 130.

The NFVO 112 may coordinate, authorize, release and engage resources of the NFVI 104 in order to provide the requested network service (e.g., which may be used to execute an EPC function, component, or slice). The NM 114 may provide a package of end-user functions with the responsibility for the management of a network, which may include network elements with the VNFs 108, non-virtualized network functions, or both (management of the VNFs 108 may occur via the EM 110). The OSS portion of the OSS/BSS 122 is responsible for network management, fault management, configuration management and service management. The BSS portion of the OSS/BSS 122 is responsible for customer management, product management and order management. In the NFV architecture, the current OSS/BSS 122 of an operator may be interworking with an NFV management and orchestration (NFV-MANO) 132 using standard interfaces (or reference points).

Interconnection points (or reference points) between functional blocks can expose an external view of a functional block. These can include OS-Ma-nfvo between the NM 114 and the NFVO 112; Ve-Vnfm-em between the EM 110 and the VNFM 106; Ve-Vnfm-vnf between the VNF 108 and VNFM 106; Or-Vnfm between the NFVO 112 and the VNFM 106; Or-Vi between the NFVO 112 and the VIM 102; Vi-Vnfm between the VNFM 106 and the VIM 102; Nf-Vi between the NFVI 104 and the VIM 102; Vn-Nf between the NFVI 104 and the VNF 108; and Itf-N between the EM 110 or the DM 126 and the NM 114.

A virtualized resource performance management interface has been defined for reference point Vi-Vnfm between the VIM 102 and VNFM 106 as shown in FIG. 1. The operations to create a PM job and notify the availability of PM data can be transmitted using the above-mentioned interface. The usage of an individual virtual CPU (sometimes called a virtual processor or vCPU) is a part of a virtualized resource (VR), or the consolidated usage of all virtual CPUs of a Virtualized Compute Resource, and can be monitored by a performance measurement.

In certain embodiments, when the PM data is collected (i.e., PM data related to 3GPP Network Function and 3GPP NF PM data related to VR), the NM 114 creates a PM collection task at the EM 110 so that the EM 110 knows the measurement types, the measured resources, the recording periods and collection times wanted. For PM data related to 3GPP network function collection, the EM 110 requests the VNF(s) 108 to collect the PM data related to 3GPP network function as specified by the NM 114. For VNF PM data related to VR collection, the EM 110 creates a PM collection task at the VNFM 106 to collect VNF/VNFC PM data related to VR, based on the information provided by the NM 114 so that the VNFM 106 knows the measurement types, the measured resources, the recording periods, and the collection times wanted. Then, the VNFM 106 creates a PM collection task at the VIM 102 based on the information provided by the EM 110. The VIM 102 requests the NFVI 104 to collect the VR PM data as specified by the VNFM 106.

Figure 2:
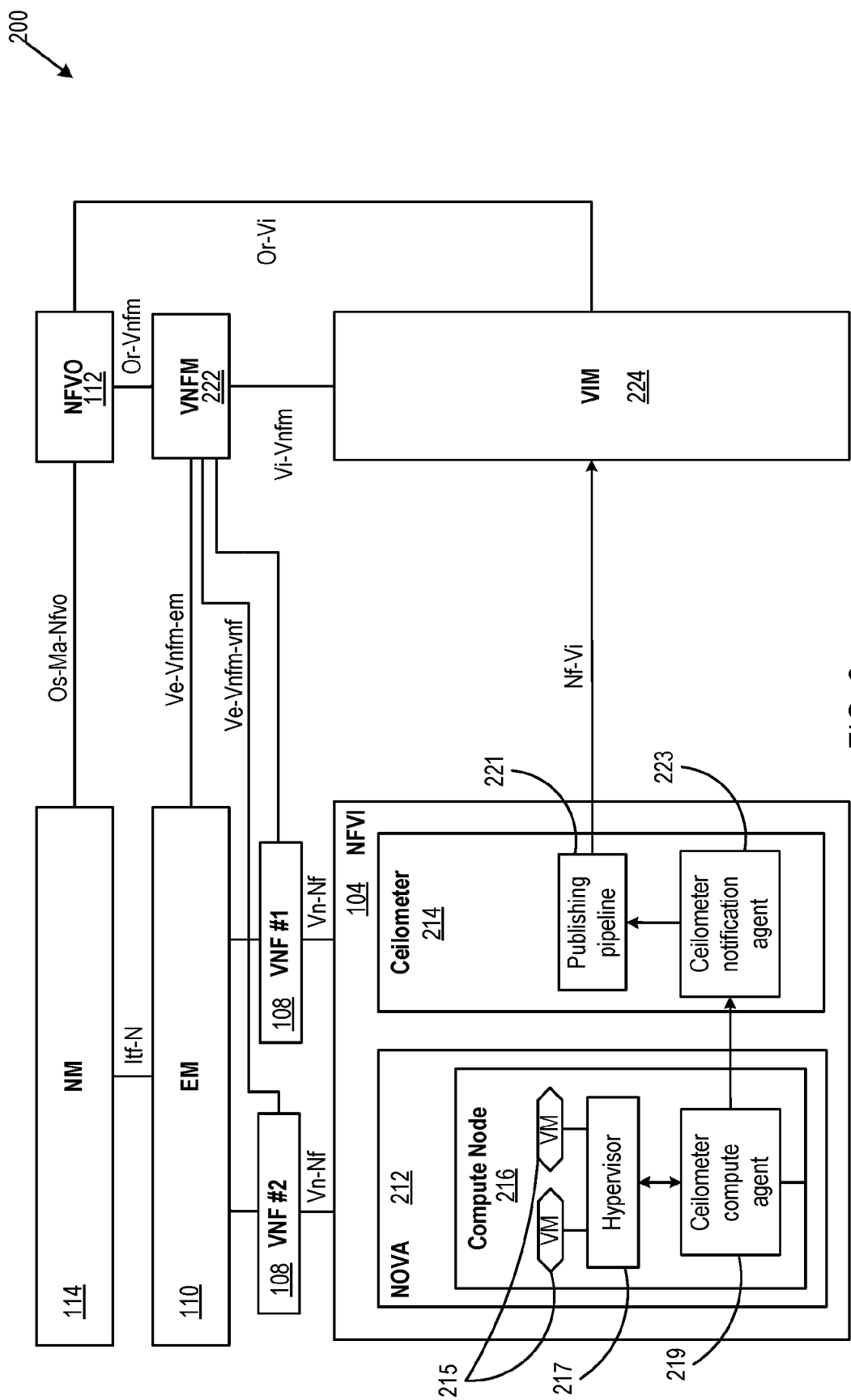
FIG. 2 is a schematic diagram illustrating a system for collecting and distributing virtual resource metrics consistent with embodiments disclosed herein.

FIG. 2 depicts the collection and publishing of virtualized resources metrics from a virtual machine (VM). For example, a compute node 216 in a NOVA 212 (a component of OpenStack) is composed of VM(s) 215 running on a hypervisor 217. A Ceilometer compute agent 219 in the compute node 216 is polling the hypervisor 217 periodically to collect resource usage data of VM instances 215 within an OpenStack deployment, such as through use of a Ceilometer 214. The Ceilometer compute agent 219 then uses Rabbit messages to send metrics to a Ceilometer notification agent 223 that uses a pipeline 221 to process the metrics and send the metrics to a VIM 224. The VIM 224 can send to a VNFM 222 virtual resource measurement reports that include virtual resource measurements.

Performance metrics can include virtual CPU usage metrics, memory usage metrics, disk usage metrics and networking metrics. The measurements can include those in the table below. The metrics can be received at the VIM 224 to be used to define the performance measurements in clause 6. The measurements are derived from the performance metrics. In some embodiments, the Ceilometer project in the OpenStack Telemetry service is responsible for collection of metrics.

| Measurements received at VIM | Description |
|---|---|
| cpu_utilization | Measure the percentage of CPU utilization in the measurement interval that can be derived from Processor Utilization metric. |
| memory_utilization | Measure the percentage of memory utilization in the measurement interval that can be derived from the amount of memory used, which is the sum of Memory Buffered, Memory Cached, Memory Free, Memory Slab, and the amount of memory allocated. |
| disk_utilization | Measure the percentage of disk utilization. See Annex A for an example of the measurement mapping from disk.usage and disk.allocation measurements. |
| num_of_incoming_packets | Measure the number of incoming packets in the measurement interval that can be derived from received Packet Count metric. |
| num_of_outgoing_packets | Measure the number of outgoing packets in the measurement interval that can be derived from transmitted Packet Count metric. |
| num_of_incoming_bytes | Measure the number of incoming octets in the measurement interval that can be derived from received Octet Count metric. |
| num_of_outgoing_bytes | Measure the number of outgoing octets in the measurement interval that can be derived from transmitted Octet Count metric. |

Virtual CPU usage metric measures the statistics of CPU usage of a VM instance. This metric is provided by cpu_util measurement, as defined in OpenStack Compute. The cpu_util measurement is a Gauge counter that measures the percentage of CPU utilization of a VM instance in a polling interval. The VM instance is identified by the Instance ID.

| Name | Type | Unit | Resource | Origin | Support | Note |
|---|---|---|---|---|---|---|
| cpu_util | Gauge | % | instance ID | Pollster | vSphere | Average CPU utilization |

Memory usage metric measures the statistics of memory usage of a VM instance. This metric is provided by memory_util that is computed from the memory and memory.usage measurements, as defined in OpenStack Compute. The memory measurement is a Gauge counter that measures the volumes of RAM allocated to a VM instance in a polling interval. The memory.usage measurement is a Gauge counter that measures the volumes of RAM used by a VM instance in a polling interval. The VM instance is identified by the Instance ID.

| Name | Type | Unit | Resource | Origin | Support | Note |
|---|---|---|---|---|---|---|
| memory | Gauge | MB | instance ID | Notification | Libvirt, Hyper-V | Volume of RAM allocated to the instance |
| memory.usage | Gauge | MB | instance ID | Pollster | vSphere | Volume of RAM used by the instance from the amount of its allocated memory |

The pipeline processing contains a transformer to perform arithmetic calculations over multiple metrics to produce the memory_util that is the percentage of memory usage by a VM instance in a polling interval. The transformer for memory_util is shown below:

$$memory\_util = 100 * memory.usage / memory$$

Disk usage metric measures the statistics of disk usage of a VM instance. This metric is provided by disk_util that is computed from the disk.allocation and disk.usage measurements, as defined in OpenStack Compute. Disk measurement is a Gauge counter that measures the amount of disk occupied by a VM instance in a polling interval. The disk.usage measurement is a Gauge counter that measures the volumes of disk used by a VM instance in a polling interval. The VM instance is identified by the Instance ID.

| Name | Type | Unit | Resource | Origin | Support | Note |
|---|---|---|---|---|---|---|
| disk.allocation | Gauge | B | instance ID | Pollster | Libvirt | The amount of disk occupied by the instance on |

-continued

| Name | Type | Unit | Resource | Origin | Support | Note |
|---|---|---|---|---|---|---|
| disk.usage | Gauge | B | instance ID | Pollster | Libvirt | the host machine The physical size in bytes of the image container on the host |

The pipeline processing contains a transformer to perform arithmetic calculations over multiple metrics to produce the disk_util that is the percentage of disk usage by a VM instance in a polling interval. The transformer for disk_util is shown below:

disk_util=100*disk.usage/disk.allocation

Networking metrics are used to measure the data volume in bytes or packets of the network interfaces. These metrics can include a network incoming bytes metric, network outgoing bytes metric, network incoming packets metric and/or network outgoing packets metric.

Network incoming bytes metric measures the number of bytes that a VM instance receives on the network interface. This metric is provided by network.incoming.bytes measurement, as defined in OpenStack Compute. The network.incoming.bytes measurement is a Cumulative counter that measures the number of incoming bytes received by a VM instance in a polling interval. The VM instance is identified by the Instance ID.

| Name | Type | Unit | Resource | Origin | Support | Note |
|---|---|---|---|---|---|---|
| network.incoming.bytes | Cumulative | B | interface ID | Pollster | Libvirt, Hyper-V | Number of incoming bytes |

Network outgoing bytes metric measures the number of bytes that a VM instance transmits on the network interface. This metric is provided by network.outgoing.bytes measurement, as defined in OpenStack Compute. The network.outgoing.bytes measurement is a Cumulative counter that measures the number of outgoing bytes received by a VM instance in a polling interval. The VM instance is identified by the Instance ID.

| Name | Type | Unit | Resource | Origin | Support | Note |
|---|---|---|---|---|---|---|
| network.outgoing.bytes | Cumulative | B | interface ID | Pollster | Libvirt, Hyper-V | Number of outgoing bytes |

Network incoming packets metric measures the number of bytes that a VM instance receives on the network interface. This metric is provided by network.incoming.packets measurement, as defined in OpenStack Compute. The network.incoming.packets measurement is a Cumulative counter that measures the number of incoming packets received by a VM instance in a polling interval. The VM instance is identified by the Instance ID.

| Name | Type | Unit | Resource | Origin | Support | Note |
|---|---|---|---|---|---|---|
| network.incoming.packets | Cumulative | packet | interface ID | Pollster | Libvirt, Hyper-V | Number of incoming packets |

Network outgoing packets metric measures the number of bytes that a VM instance transmits on the network interface. This metric is provided by network.outgoing.packets measurement, as defined in OpenStack Compute. The network.outgoing.packets measurement is a Cumulative counter that measures the number of outgoing packets received by a VM instance in a polling interval. The VM instance is identified by the Instance ID.

| Name | Type | Unit | Resource | Origin | Support | Note |
|---|---|---|---|---|---|---|
| network.outgoing.packets | Cumulative | packet | interface ID | Pollster | Libvirt, Hyper-V | Number of outgoing packets |

The sources of error for these metrics are listed below.

Counter roll-over: All counters have a finite range, and end-of-range roll-over will likely be encountered during the life of a busy interface. This is only applicable to cumulative counters. Mitigations include a counter with a bigger range, or a mechanism to detect the counter roll-over.

The length of polling interval may impact the accuracy of Gauge counters. Mitigation is to reduce the polling interval. But, if the polling interval is too short, it will likely cause increase of stored data and stress on the service application programming interfaces (APIs).

Measurements can be defined by different aspects. The aspects can include a Description, Collection Method, Trigger, Measurement Unit, Measurement Group and Measurement Object Type. The Description contains the description of the performance measurement. The Collection Method contains the method in which this measurement is obtained. This can include Status Counter (SC) or Transparent Forwarding (TF). For an SC, the entity receives a metric at each predetermined interval. A measurement is generated from processing (e.g., arithmetic mean, peak) all of the samples received in the collection period. For TF, the entity maintains a measurement count that stores the content of the metric that it received. The Trigger contains the trigger which causes the counter to be updated. The Measurement Unit contains the unit of the measurement value. The Measurement Group contains the group to which a measurement belongs. The Measured Object Type describes the object of a measurement.

A measurement of Mean virtual CPU usage provides the mean virtual CPU usage of the virtualised compute resource. It is collected via an SC. It is triggered when VIM receives the virtual CPU usage metric from NFVI at the pre-defined interval, and then takes the arithmetic mean of the virtual CPU usage metrics received in the collection period. For example, VIM receives the cpu_utilization measurement for the virtual compute instance from NFVI at the pre-defined interval, and then takes the arithmetic mean of the virtual CPU usage metrics received in the collection period. Each measurement is a real value indicating the percentage of the virtual CPU resources that are used. The measurement is part of a VirtualisedComputeResource measurement group. The Measured Object Type includes objectType, objectInstanceId, or VirtualCompute. It can be named VcpuUsageMean. In some embodiments, it is assumed that the collection period is the multiple of the pre-defined interval.

A measurement of Peak virtual CPU usage provides the peak virtual CPU usage of the virtualised compute resource. It is collected via an SC. It is triggered when VIM receives the virtual CPU usage metric from NFVI at the pre-defined interval, and then selects the maximum metric among the virtual CPU usage metrics received in the collection period. For example, VIM receives the cpu_utilization measurement for the virtual compute instance from NFVI at the pre-defined interval, and then selects the maximum metric among the virtual CPU usage metrics received in the collection period. Each measurement is a real value indicating the percentage of the virtual CPU resources that are used. The measurement is part of a VirtualisedComputeResource measurement group. The Measured Object Type includes objectType, objectInstanceId, or VirtualCompute. It can be named VcpuUsagePeak.

A measurement of Mean memory usage provides the mean memory usage of the virtualised storage Resource. It is collected via an SC. It is triggered when VIM receives the memory usage metric from NFVI at the pre-defined interval, and then takes the arithmetic mean of the memory usage metrics received in the collection period. For example, VIM receives the memory_utilization measurement for the virtual compute instance from NFVI at the pre-defined interval, and then takes the arithmetic mean of the memory usage metrics received in the collection period. Each measurement is a real value indicating the percentage of the memory resources that are used. The measurement is part of a VirtualisedComputeResource measurement group. The Measured Object Type includes objectType, objectInstanceId, or VirtualCompute. It can be named VmemoryUsageMean.

A measurement of Peak memory usage provides the peak memory usage of the Virtualised Compute Resource. It is collected via an SC. It is triggered when VIM receives the memory usage metric from NFVI at the pre-defined interval, and then selects the maximum metric among the memory usage metrics received in the collection period. For example, VIM receives the memory_utilization measurement for the virtual compute instance from NFVI at the pre-defined interval, and then selects the maximum metric among the memory usage metrics received in the collection period. Each measurement is a real value indicating the percentage of the memory resources that are used. The measurement is part of a VirtualisedComputeResource measurement group. The Measured Object Type includes objectType, objectInstanceId, or VirtualCompute. It can be named VmemoryUsagePeak.

A measurement of Mean disk usage provides the mean disk usage of the virtualised storage resource. It is collected via an SC. It is triggered when VIM receives the disk usage from NFVI at the pre-defined interval, and then takes the arithmetic mean of the disk usage metrics received in the collection period. For example, VIM receives the disk_utilization measurement for the virtual compute instance from NFVI at the pre-defined interval, and then takes the arithmetic mean of the disk usage metrics received in the collection period. Each measurement is a real value indicating the percentage of the disk resources that are used. The measurement is part of a VirtualisedComputeResource measurement group. The Measured Object Type includes objectType, objectInstanceId, or VirtualCompute. It can be named VdiskUsageMean.

A measurement of Peak disk usage provides the peak disk usage of the Virtualised Compute Resource. It is collected via an SC. It is triggered when VIM receives the disk usage metric from NFVI at the pre-defined interval, and then selects the maximum metric among the disk usage metrics received in the collection period. For example, VIM receives the disk_utilization measurement for the virtual compute instance from NFVI at the pre-defined interval, and then selects the maximum metric among the disk usage metrics received in the collection period. Each measurement is a real value indicating the percentage of the disk resources that are used. The measurement is part of a VirtualisedComputeResource measurement group. The Measured Object Type includes objectType, objectInstanceId, or VirtualCompute. It can be named VdiskUsagePeak.

A measurement of Number of incoming bytes on networking resource or Number of incoming bytes on virtual compute provides the number of bytes received by the virtualised networking resource or the number of bytes received at the virtual compute. This measurement is split into subcounters per virtual network interface, which is the communication endpoint under an instantiated compute resource. It is collected via TF or Object Mapping (or OM, e.g., the entity receives a metric for measured object A in the collection period and maps the received metric from measured object A to measured object B). It is generated when VIM receives the network incoming bytes metric from NFVI. For example, VIM receives one or more num_of_incoming_bytes measurements for a virtual network interface from NFVI in the collection period, and maps the received num_of_incoming_bytes measurement(s) from the virtual network interface to the Virtual Compute instance. The VIM generates the measurement for the subject Virtual Compute instance by assigning the value of the received num_of_incoming_bytes measurement(s) to the sub-counter(s) per virtual network interface. Each measurement is a real value indicating the virtual networking resources that are used. The measurement is part of a VirtualisedComputeResource or VirtualNetworkInterface measurement group. The Measured Object Type includes objectType, objectInstanceId, or VirtualCompute. It can be named VnetByteIncoming.vNetItfId, where vNetItfId is equal to the resourceId of the measured virtual network interface.

A measurement of Number of outgoing bytes on networking resource or Number of outgoing bytes on virtual compute provides the number of bytes transmitted by the virtualised networking resource or the number of bytes transmitted at the virtual compute. This measurement is split into subcounters per virtual network interface, which is the communication endpoint under an instantiated compute resource. It is collected via TF or OM. It is generated when VIM receives the network outgoing bytes metric from NFVI. Each measurement is a real value indicating the percentage of the virtual networking resources that are used. For example, VIM receives one or more num_of_outgoing_bytes measurements for a virtual network interface from NFVI in the collection period, and maps the received num_of_outgoing_bytes measurement(s) from the virtual network interface to the Virtual Compute instance. The VIM generates the measurement for the subject Virtual Compute instance by assigning the value of the received num_of_outgoing_bytes measurement(s) to the sub-counter(s) per virtual network interface. Each measurement is a real value indicating the virtual networking resources that are used. The measurement is part of a VirtualisedComputeResource or VirtualNetworkInterface measurement group. The Measured Object Type includes objectType, objectInstanceId, or VirtualCompute. It can be named VnetByteOutgoing.vNetItfId, where vNetItfId is equal to the resourceId of the measured virtual network interface.

A measurement of Number of incoming packets on networking resource or Number of incoming packets on virtual compute provides the number of packets received by the virtualised networking resource or the number of packets received at the virtual compute. It is collected via TF or OM. It is generated when VIM receives the network incoming packets metric from NFVI. For example, VIM receives one or more num_of_incoming_packets measurements for a virtual network interface from NFVI in the collection period, and maps the received num_of_incoming_packets measurement(s) from the virtual network interface to the Virtual Compute instance. The VIM generates the measurement for the subject Virtual Compute instance by assigning the value of the received num_of_incoming_packets measurement(s) to the sub-counter(s) per virtual network interface. Each measurement is a real value indicating the virtual networking resources that are used. The measurement is part of a VirtualisedComputeResource or VirtualNetworkInterface measurement group. The Measured Object Type includes objectType, objectInstanceId, or VirtualCompute. It can be named VnetPacketIncoming.vNetItfId, where vNetItfId is equal to the resourceId of the measured virtual network interface.

A measurement of Number of outgoing packets on networking resource or Number of outgoing packets on virtual compute provides the number of packets transmitted by the virtualised networking resource or the number of packets transmitted at the virtual compute. It is collected via TF or OM. It is generated when VIM receives the network outgoing packets metric from NFVI. For example, VIM receives one or more num_of_outgoing_packets measurements for a virtual network interface from NFVI in the collection period, and maps the received num_of_outgoing_packets measurement(s) from the virtual network interface to the Virtual Compute instance. The VIM generates the measurement for the subject Virtual Compute instance by assigning the value of the received num_of_outgoing_packets measurement(s) to the sub-counter(s) per virtual network interface. Each measurement is a real value indicating the virtual networking resources that are used. The measurement is part of a VirtualisedComputeResource or VirtualNetworkInterface measurement group. The Measured Object Type includes objectType, objectInstanceId or VirtualCompute. It can be named VnetPacketOutgoing.vNetItfId, where vNetItfId is equal to the resourceId of the measured virtual network interface.

The metrics can be mapped as seen in the chart below.

| NFV-TST008 metrics | Open Stack Telemetry measurements | | | | | | |
|---|---|---|---|---|---|---|---|
| | Name | Type | Unit | Resource | Origin | Support | Note |
| Processor Utilization | cpu_util | Gauge | % | instance ID | Pollster | vSphere | Average CPU utilization |
| (see note 1) | Memory (see note 5) | Gauge | MB | instance ID | Notification | Libvirt, Hyper-V | Volume of RAM allocated to the instance |
| Memory Buffered, Memory Cached, Memory Free, Memory Slab (see note 2) | memory.usage (see note 5) | Gauge | MB | instance ID | Pollster | vSphere | Volume of RAM used by the instance from the amount of its allocated memory |
| (see note 3) | disk.allocation (see note 6) | Gauge | B | instance ID | Pollster | Libvirt | The amount of disk occupied by the instance on the host machine |
| (see note 4) | disk.usage (see note 6) | Gauge | B | instance ID | Pollster | Libvirt | The physical size in bytes of the image container on the host |
| Octet Count received | network.incoming.bytes | Cumulative | B | interface ID | Pollster | Libvirt, Hyper-V | Number of incoming bytes |
| Octet Count transmitted | network.outgoing.bytes | Cumulative | B | interface ID | Pollster | Libvirt, Hyper-V | Number of outgoing bytes |
| Packet Count received | network.incoming.packets | Cumulative | packet | interface ID | Pollster | Libvirt, Hyper-V | Number of incoming packets |
| Packet Count transmitted | network.outgoing.packets | Cumulative | packet | interface ID | Pollster | Libvirt, Hyper-V | Number of outgoing packets | note 1: The size of the memory allocated to an instance can be derived from VirtualMemory.
note 2: The size of the memory used by an instance can be computed from the sum of Memory Buffered, Memory Cached, Memory Free, and Memory Slab.
note 3: The size of the disk allocated to an instance can be derived from VirtualStorageData.
note 4: No corresponding metric is defined.
note 5: memory.usage and memory can be used to compute memory_utilization = 100 * memory.usage/memory.
note 6: disk.usage and disk.allocation can be used to compute disk_utilization = 100 * disk.usage/disk.allocation.

Figure 3:
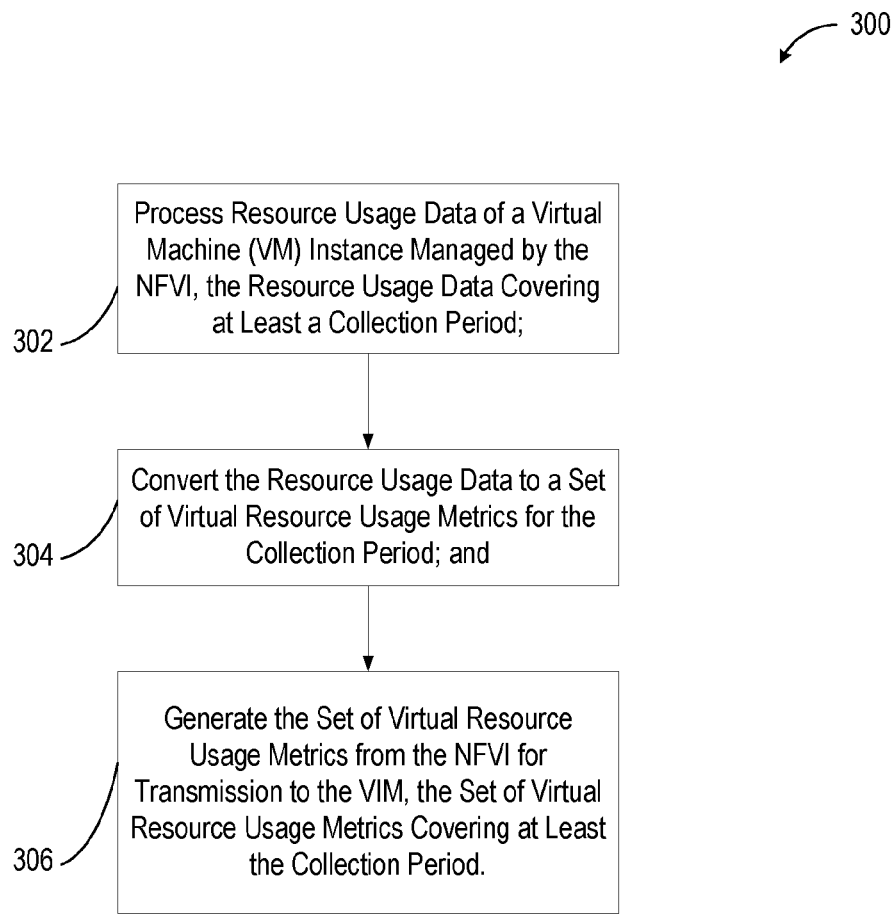
FIG. 3 is a flow chart illustrating a method for virtual resource metric management in a network function virtualization infrastructure (NFVI) consistent with embodiments disclosed herein.

FIG. 3 is a flow chart illustrating a method 300 for virtual resource metric management in a network function virtualization infrastructure (NFVI). The method 300 can be performed by a system such as the one shown in FIGS. 1 and 2. In block 302, the NFVI processes resource usage data of a virtual machine (VM) instance managed by the NFVI, the resource usage data covering at least a collection period. In block 304, the NFVI converts the resource usage data to a set of virtual resource usage metrics for the collection period. In block 306, the NFVI generates the set of virtual resource usage metrics from the NFVI for transmission to the VIM, the set of virtual resource usage metrics covering at least the collection period.

Figure 4:
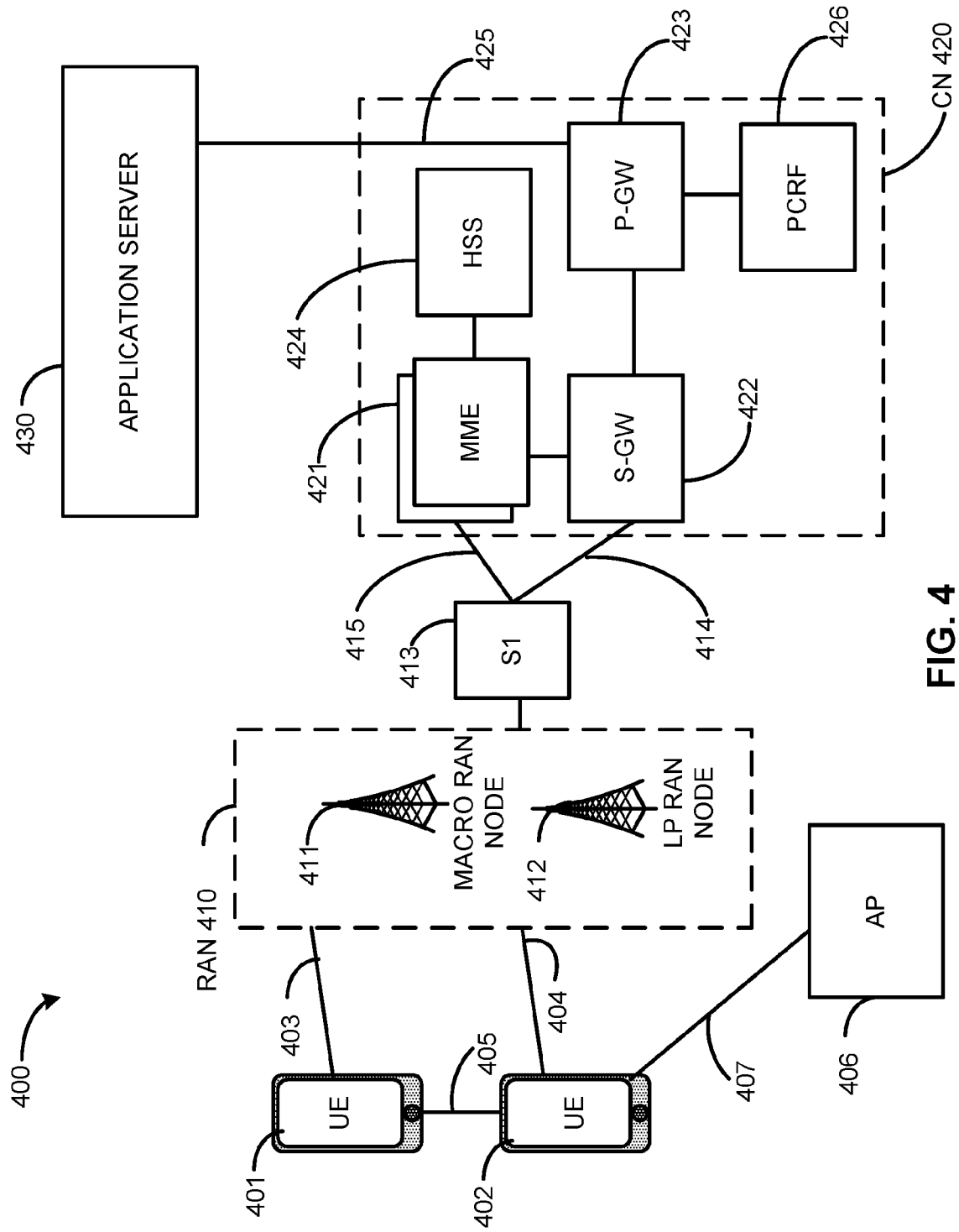
FIG. 4 illustrates an architecture of a system of a network consistent with embodiments disclosed herein.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410. The RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 may be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 402 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and a serving gateway (S-GW) 422, and an S1-mobility management entity (MME) interface 415, which is a signaling interface between the RAN nodes 411 and 412 and MMEs 421.

In this embodiment, the CN 420 comprises the MMEs 421, the S-GW 422, a Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the CN 420 (e.g., an EPC network) and external networks such as a network including the application server 430 (alternatively referred to as application function (AF)) via an Internet Protocol (IP) interface 425. Generally, an application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. A Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
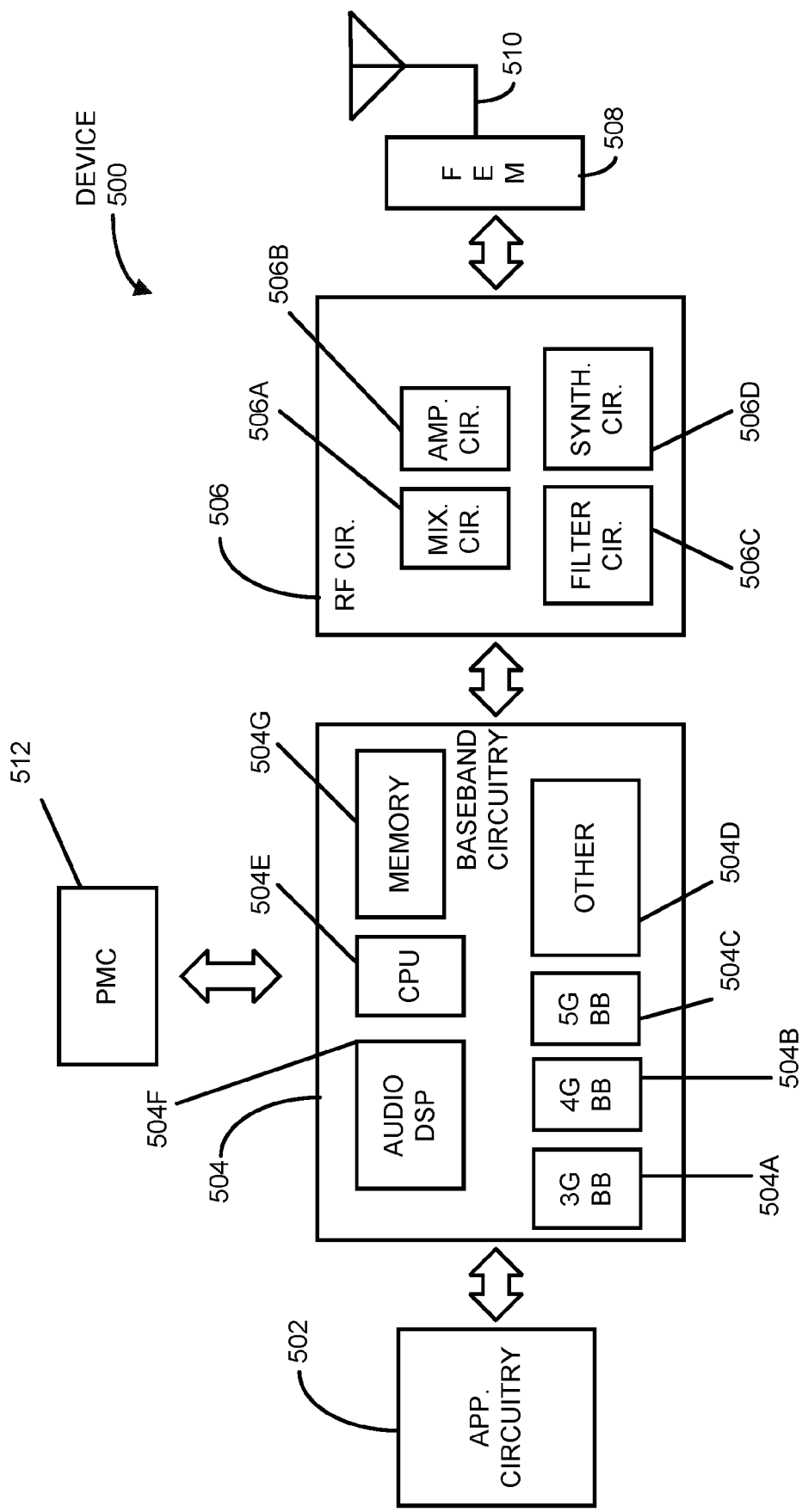
FIG. 5 illustrates example components of a device consistent with embodiments disclosed herein.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. The RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506A, amplifier circuitry 506B and filter circuitry 506C. In some embodiments, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 506A of the receive signal path may comprise passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 504 and may be filtered by the filter circuitry 506C.

In some embodiments, the mixer circuitry 506A of the receive signal path and the mixer circuitry 506A of the transmit signal path may include two or more mixers and may be arranged for quadrature downconversion and upconversion, respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer comprising a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 502 (such as an applications processor) depending on the desired output frequency. In some embodiments, a divider control input (e.g., N) may be determined from a look-up table based on a channel indicated by the application circuitry 502.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. The FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM circuitry 508, or in both the RF circuitry 506 and the FEM circuitry 508.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by the RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device 500 is included in a UE. The PMC 512 may increase the power conversion efficiency while providing desirable implementation size and heat dissipation characteristics.

FIG. 5 shows the PMC 512 coupled only with the baseband circuitry 504. However, in other embodiments, the PMC 512 may be additionally or alternatively coupled with, and perform similar power management operations for, other components such as, but not limited to, the application circuitry 502, the RF circuitry 506, or the FEM circuitry 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
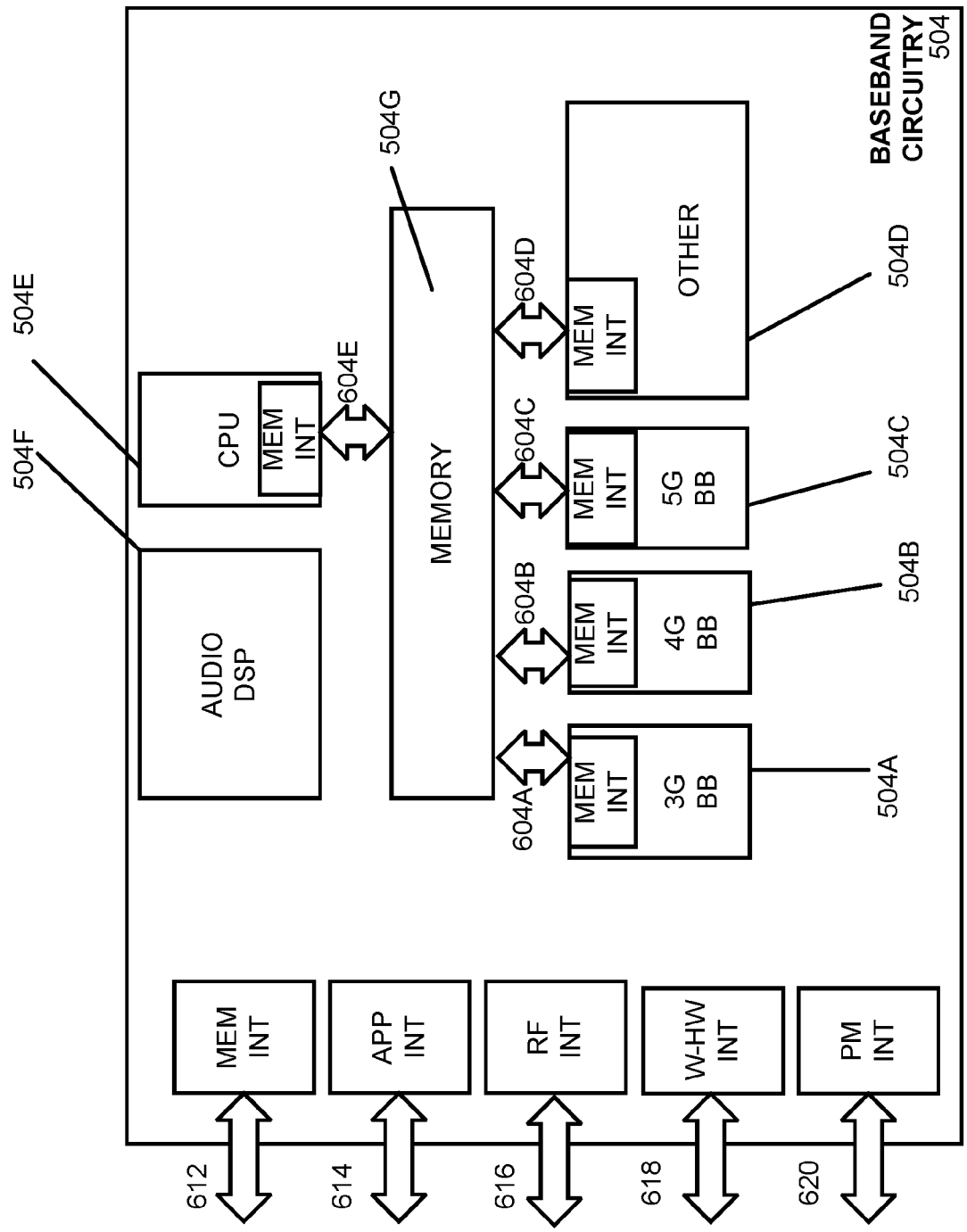
FIG. 6 illustrates example interfaces of baseband circuitry consistent with embodiments disclosed herein.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

Figure 7:
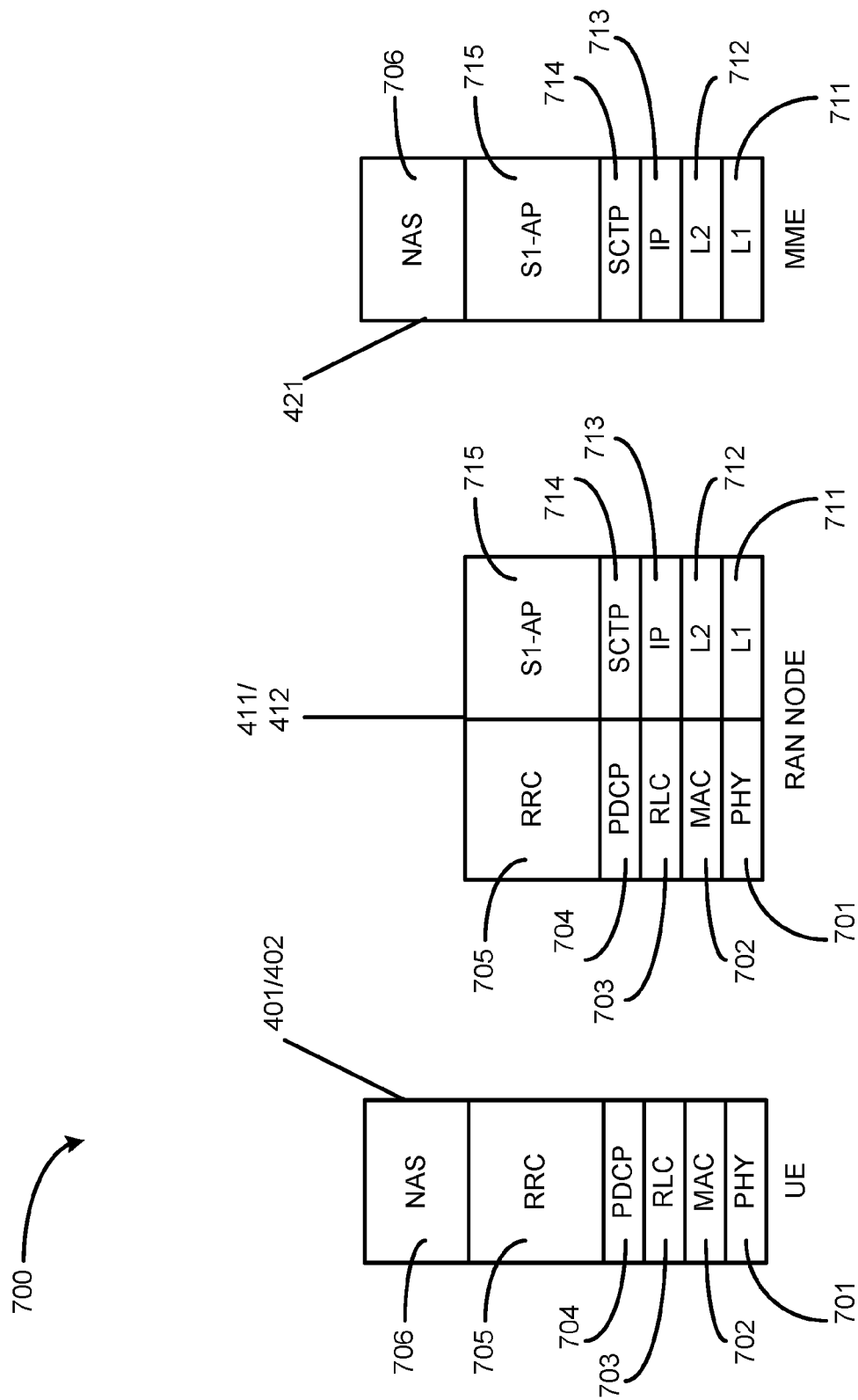
FIG. 7 is an illustration of a control plane protocol stack consistent with embodiments disclosed herein.

FIG. 7 is an illustration of a control plane protocol stack in accordance with some embodiments. In this embodiment, a control plane 700 is shown as a communications protocol stack between the UE 401 (or alternatively, the UE 402), the RAN node 411 (or alternatively, the RAN node 412), and the MME 421.

A PHY layer 701 may transmit or receive information used by the MAC layer 702 over one or more air interfaces.

The PHY layer 701 may further perform link adaptation or adaptive modulation and coding (AMC), power control, cell search (e.g., for initial synchronization and handover purposes), and other measurements used by higher layers, such as an RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 401 and the RAN node 411 may utilize a Uu interface (e.g., an LTE-Uu interface) to exchange control plane data via a protocol stack comprising the PHY layer 701, the MAC layer 702, the RLC layer 703, the PDCP layer 704, and the RRC layer 705.

In the embodiment shown, the non-access stratum (NAS) protocols 706 form the highest stratum of the control plane between the UE 401 and the MME 421. The NAS protocols 706 support the mobility of the UE 401 and the session management procedures to establish and maintain IP connectivity between the UE 401 and the P-GW 423.

The S1 Application Protocol (S1-AP) layer 715 may support the functions of the S1 interface and comprise Elementary Procedures (EPs). An EP is a unit of interaction between the RAN node 411 and the CN 420. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 714 may ensure reliable delivery of signaling messages between the RAN node 411 and the MME 421 based, in part, on the IP protocol, supported by an IP layer 713. An L2 layer 712 and an L1 layer 711 may refer to communication links (e.g., wired or wireless) used by the RAN node and the MME to exchange information.

The RAN node 411 and the MME 421 may utilize an S1-MME interface to exchange control plane data via a protocol stack comprising the L1 layer 711, the L2 layer 712, the IP layer 713, the SCTP layer 714, and the S1-AP layer 715.

Figure 8:
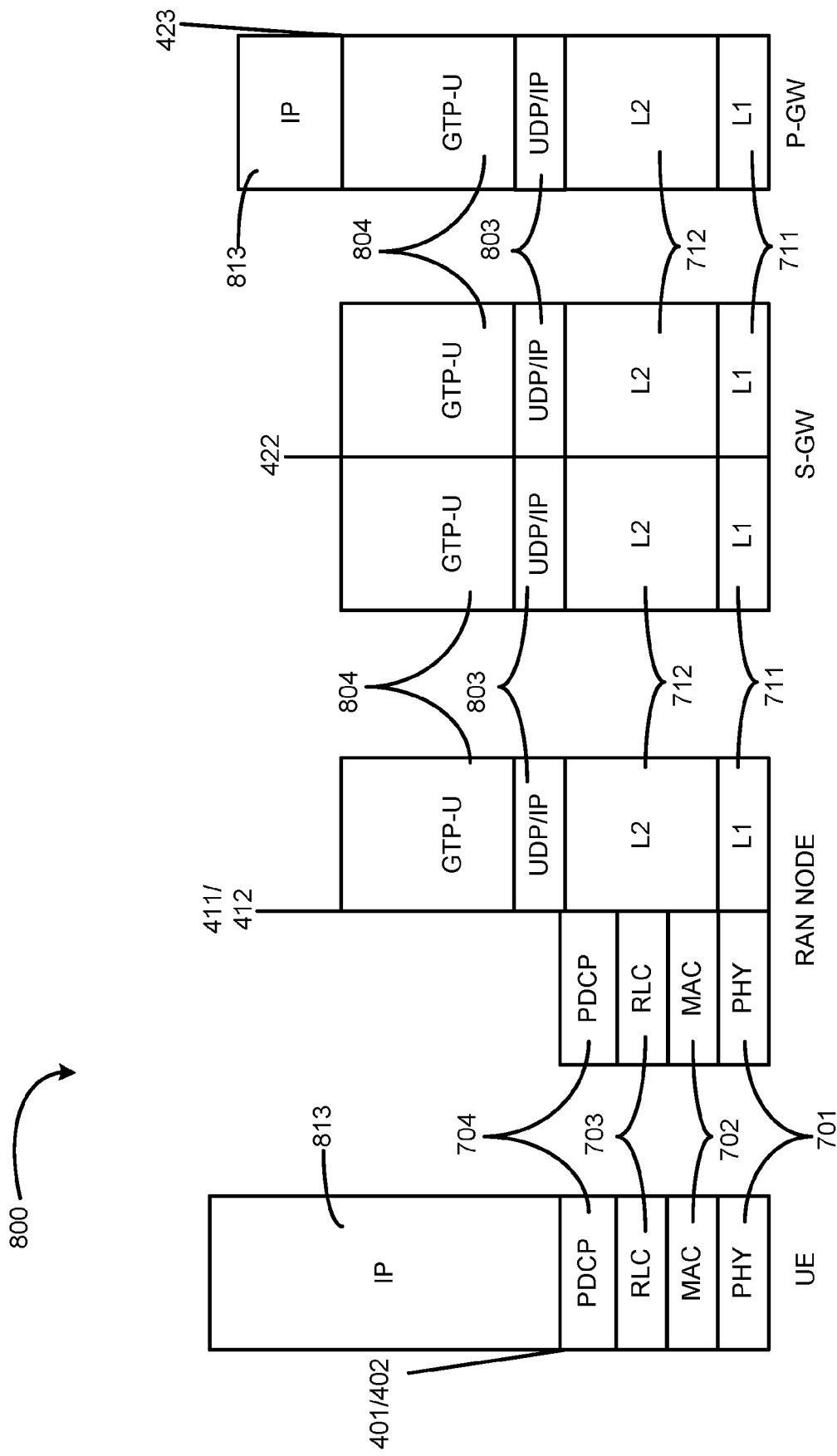
FIG. 8 is an illustration of a user plane protocol stack consistent with embodiments disclosed herein.

FIG. 8 is an illustration of a user plane protocol stack in accordance with some embodiments. In this embodiment, a user plane 800 is shown as a communications protocol stack between the UE 401 (or alternatively, the UE 402), the RAN node 411 (or alternatively, the RAN node 412), the S-GW 422, and the P-GW 423. The user plane 800 may utilize at least some of the same protocol layers as the control plane 700. For example, the UE 401 and the RAN node 411 may utilize a Uu interface (e.g., an LTE-Uu interface) to exchange user plane data via a protocol stack comprising the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 411 and the S-GW 422 may utilize an S1-U interface to exchange user plane data via a protocol stack comprising the L1 layer 711, the L2 layer 712, the UDP/IP layer 803, and the GTP-U layer 804. The S-GW 422 and the P-GW 423 may utilize an S5/S8a interface to exchange user plane data via a protocol stack comprising the L1 layer 711, the L2 layer 712, the UDP/IP layer 803, and the GTP-U layer 804. As discussed above with respect to FIG. 7, NAS protocols support the mobility of the UE 401 and the session management procedures to establish and maintain IP connectivity between the UE 401 and the P-GW 423.

Figure 9:
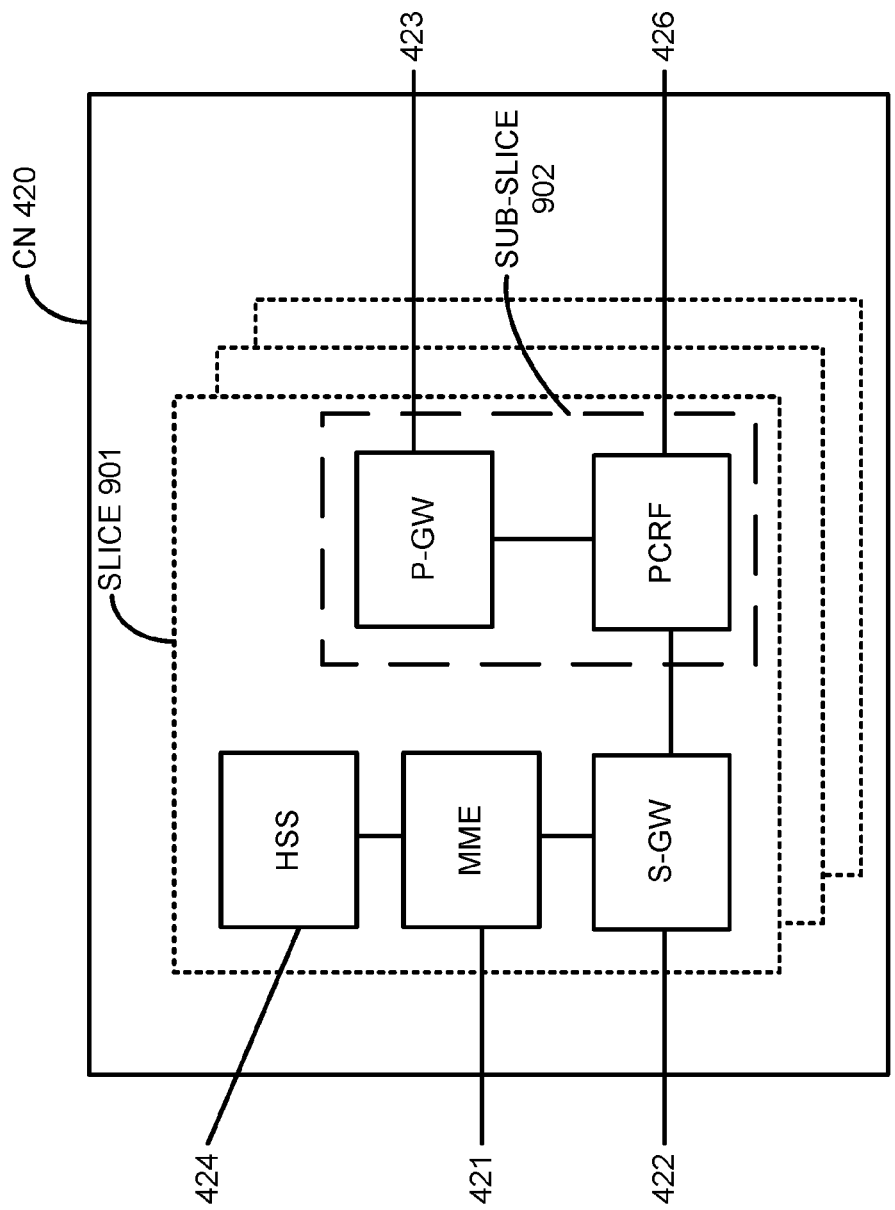
FIG. 9 illustrates components of a core network consistent with embodiments disclosed herein.

FIG. 9 illustrates components of a core network in accordance with some embodiments. The components of the CN 420 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 420 may be referred to as a network slice 901. A logical instantiation of a portion of the CN 420 may be referred to as a network sub-slice 902 (e.g., the network sub-slice 902 is shown to include the PGW 423 and the PCRF 426).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
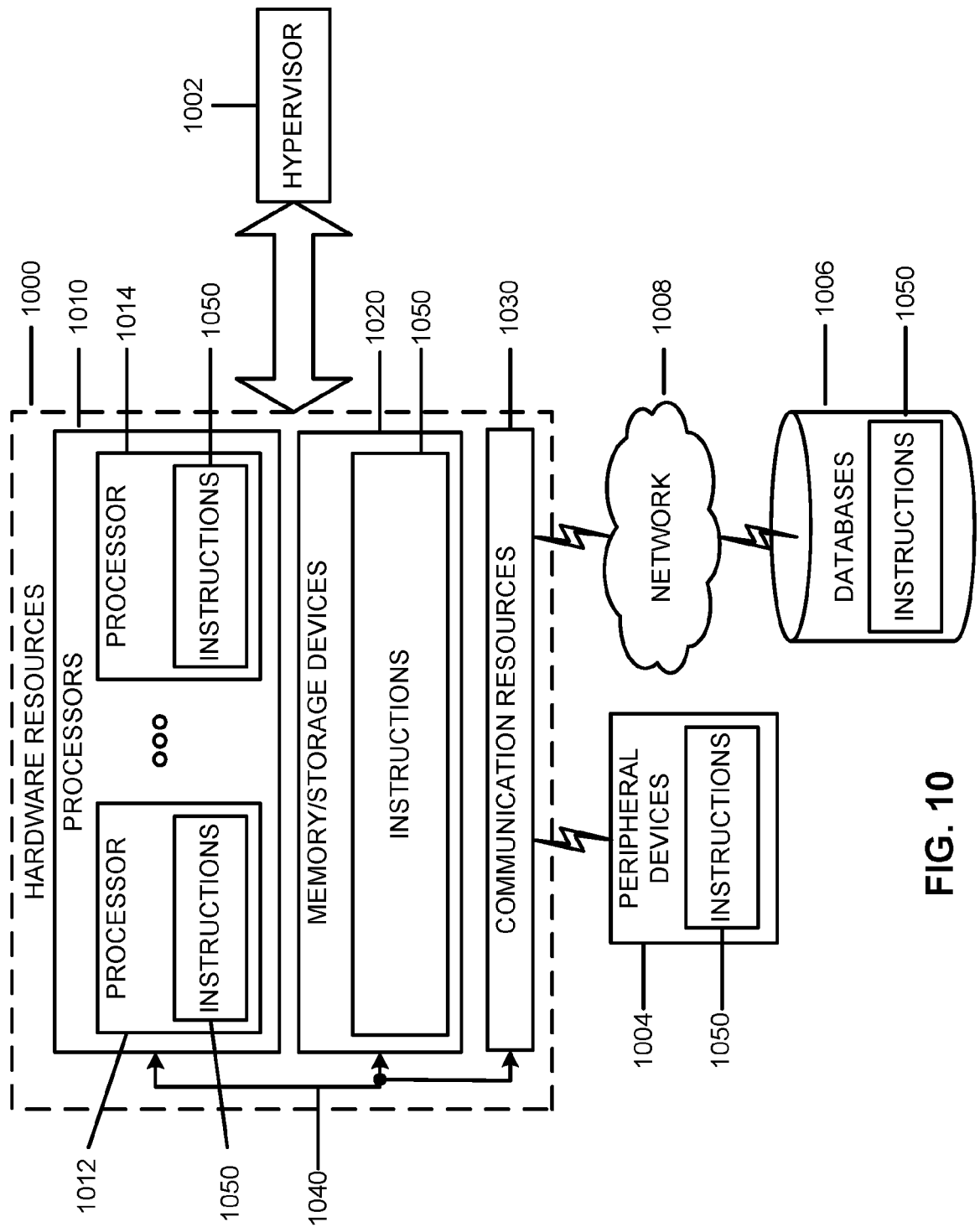
FIG. 10 is a block diagram illustrating components able to read instructions from a machine-readable or computer-readable medium and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Examples

The following examples pertain to further embodiments.

Example 1 is an apparatus for a network function virtualization infrastructure (NFVI), comprising: a first interface, a second interface, and a processor. The first interface coupled to a virtualized infrastructure manager (VIM). The second interface coupled to a system configured to provide measurements of a virtualized compute resource of a virtual machine (VM) instance. The processor coupled to the first interface and the second interface, the processor configured to: process resource usage data of the VM instance associated with the NFVI, the resource usage data covering at least a collection period; compute a set of virtual resource usage metrics for the collection period based at least in part on the resource usage data; and generate the set of virtual resource usage metrics from the NFVI for transmission to the VIM, the set of virtual resource usage metrics covering at least the collection period.

Example 2 is the apparatus of Example 1, wherein the resource usage data comprises status counter metrics to measure a set of discrete events with fluctuating values at a set of intervals.

Example 3 is the apparatus of Example 2, wherein the status counter metrics further comprise an arithmetic mean value of virtual resource usage or peak value of virtual resource usage.

Example 4 is the apparatus of Example 1, wherein the resource usage data comprises transparent forwarding of content of virtual resource usage of the VM instance as measured.

Example 5 is the apparatus of any of Examples 1-4, wherein the set of virtual resource usage metrics comprises mean virtual central processing unit (CPU) usage, peak virtual CPU usage, mean memory usage, peak memory usage, mean disk usage, or peak disk usage.

Example 6 is the apparatus of any of Examples 1-4, wherein the resource usage data is a gauge measurement of discrete events at a set of intervals.

Example 7 is the apparatus of any of Examples 1-4, wherein the resource usage data is a cumulative measurement that measures a number of events in a polling interval.

Example 8 is the apparatus of any of Examples 1-4, wherein the set of virtual resource usage metrics comprises: a number of incoming bytes on virtual compute that includes a number of bytes the VM instance receives; a number of outgoing bytes on virtual compute that includes a number of bytes the VM instance transmits; a number of incoming packets on virtual compute that includes a number of packets the VM instance receives; or a number of outgoing packets on virtual compute that includes a number of packets the VM instance transmits.

Example 9 is a system for management of virtualized resources comprising: a compute node configured to execute a hypervisor and one or more virtual machines, the compute node further configured to periodically collect resource usage data of the one or more virtual machines and provide the resource usage data to a network function virtualization infrastructure (NFVI); the NFVI configured to: process resource usage data of a virtual machine (VM) instance associated with the NFVI, the resource usage data covering at least a collection period; compute a set of virtual resource usage metrics for the collection period based at least in part on the resource usage data; and generate the set of virtual resource usage metrics from the NFVI for transmission to a virtualized infrastructure manager (VIM), the set of virtual resource usage metrics covering at least the collection period; the VIM configured to: process the set of virtual resource usage metrics from the NFVI; and generate a virtual resource usage measurement for a virtualized compute resource based at least in part on the set of virtual resource usage metrics.

Example 10 is the system of Example 9, wherein the resource usage data further comprises an instance identifier of a VM instance, the instance identifier identifying at least a subset of the resource usage data that is associated with the VM instance.

Example 11 is the system of Example 9, wherein the compute node is further configured to execute a compute agent to poll the hypervisor periodically to collect the resource usage data of the VM instance within a deployment.

Example 12 is the system of Example 9, wherein at least a subset of the resource usage data is converted to a percentage of a virtual resource in use for the set of virtual resource usage metrics.

Example 13 is the system of any of Examples 9-12, wherein the set of virtual resource usage metrics comprises mean virtual central processing unit (CPU) usage, peak virtual CPU usage, mean memory usage, peak memory usage, mean disk usage, peak disk usage, number of incoming bytes, number of outgoing bytes, number of incoming packets, or number of outgoing packets.

Example 14 is the system of any of Examples 9-12, wherein to generate mean virtual central processing unit (CPU) usage, mean memory usage, or mean disk usage in a collection interval, the VIM is configured to: receive the set of virtual resource usage metrics from NFVI at a pre-defined interval; and take an arithmetic mean of the set of virtual resource usage metrics received during the collection interval.

Example 15 is the system of any of Examples 9-12, wherein to generate peak virtual central processing unit (CPU) usage, peak memory usage, or peak disk usage in a collection interval, VIM is configured to: receive the set of virtual resource usage metrics from NFVI at a pre-defined interval; and select a maximum metric among the set of virtual resource usage metrics received during the collection interval.

Example 16 is the system of any of Examples 9-12, wherein the resource usage data is a cumulative measurement of events in an interval or a measurement of discrete events.

Example 17 is the system of any of Examples 9-12, wherein the VIM is further configured to report the virtual resource usage measurement for the virtualized compute resource to a virtualised network function manager (VNFM).

Example 18 is the system of any of Examples 9-12, wherein the VIM generates the virtual resource usage measurement by receiving the set of virtual resource usage metrics in a set of polling intervals, and transparently forwards them to a virtual network functions manager (VNFM).

Example 19 is a method of managing network function virtualization infrastructure (NFVI), the method comprising: processing resource usage data of a virtual machine (VM) instance managed by the NFVI, the resource usage data covering at least a collection period; converting the resource usage data to a set of virtual resource usage metrics for the collection period; and generating the set of virtual resource usage metrics from the NFVI for transmission to a virtualized infrastructure manager (VIM), the set of virtual resource usage metrics covering at least the collection period.

Example 20 is the method of Example 19, wherein converting the resource usage data further comprises preparing an arithmetic mean of a subset of the resource usage data or selecting a maximum value of the subset of the resource usage data to form a virtual processor usage metric.

Example 21 is the method of Example 19, wherein the set of virtual resource usage metrics comprises mean virtual central processing unit (CPU) usage, peak virtual CPU usage, mean memory usage, peak memory usage, mean disk usage, peak disk usage, number of incoming bytes, number of outgoing bytes, number of incoming packets, or number of outgoing packets.

Example 22 is the method of Example 19, wherein processing resource usage data of the VM instance managed by the NFVI further comprises processing a set of messages from an agent executing on a compute node that collects the resource usage data from a hypervisor executing on the compute node.

Example 23 is an apparatus comprising means to perform a method as described in any of Examples 19-22.

Example 24 is machine-readable storage including machine-readable instructions, when executed, to implement a method or realize an apparatus as described in any of Examples 19-22.

Example 25 is a machine-readable medium including code to, when executed, cause a machine to perform the method of any one of Examples 19-22.

Example 26 is a computer program product comprising a computer-readable storage medium that stores instructions for execution by a processor to perform operations of a network function virtualization infrastructure (NFVI), the operations, when executed by the processor, to perform a method, the method comprising: processing resource usage data of a virtual machine (VM) instance managed by the NFVI, the resource usage data covering at least a collection period; converting the resource usage data to a set of virtual resource usage metrics for the collection period; and generating the set of virtual resource usage metrics from the NFVI for transmission to a virtualized infrastructure manager (VIM), the set of virtual resource usage metrics covering at least the collection period.

Additional Examples

Additional Example 1 may include an apparatus for Telemetry service, the apparatus comprising: a ceilometer compute agent; a publishing pipeline processing; and a ceilometer notification agent.

Additional Example 2 may include the apparatus of Additional Example 1 and/or some other example herein, wherein the OpenStack Ceilometer Notification Agent comprising one or more processors is to: receive the messages that contain OpenStack compute metrics from OpenStack Ceilometer Compute Agent; and request publishing pipeline processing to process the message; and send the measurement to Virtualised Infrastructure Manager (VIM).

Additional Example 3 may include the apparatus of Additional Example 1 and/or some other example herein, wherein Ceilometer compute agent in a compute node is polling the hypervisor periodically to collect the resource usage metrics of Virtual Machine (VM) instances within an OpenStack deployment.

Additional Example 4 may include the apparatus of Additional Example 1 and/or some other example herein, wherein the Telemetry service comprises the following meter types: Cumulative to count the number of events in an interval (e.g. networking bytes or packets); and Gauge to measure the discrete event with fluctuating values in an interval (e.g. vCPU, memory, disk usages).

Additional Example 5 may include the apparatus of Additional Example 3 and/or some other example herein, wherein Ceilometer compute agent is polling the hypervisor periodically to collect the resource usage metrics that comprise: cpu_util measurement that is a Gauge counter to measure the percentage of CPU utilization of a VM instance in a polling interval; and memory measurement that is a Gauge counter, to measure the volumes of RAM allocated to a VM instance in a polling interval; and memory.usage measurement that is a Gauge counter to measure the volumes of RAM used by a VM instance in a polling interval; and disk measurement that is a Gauge counter to measure the amount of disk occupied by a VM instance in a polling interval; and disk.usage measurement that is a Gauge counter to measure the volumes of disk used by a VM instance in a polling interval; and network.incoming.bytes measurement that is a Cumulative counter to measure the number of incoming bytes received by a VM instance in a polling interval; and network.outgoing.bytes measurement that is a Cumulative counter to measure the number of outgoing bytes received by a VM instance in a polling interval; and the network.incoming.packets measurement that is a Cumulative counter to measure the number of incoming packets received by a VM instance in a polling interval; and network.outgoing.packets measurement that is a Cumulative counter to measure the number of outgoing packets received by a VM instance in a polling interval.

Additional Example 6 may include the apparatus of Additional Example 5 and/or some other example herein, wherein the VM instance is identified by the Instance ID.

Additional Example 7 may include the apparatus of Additional Example 5 and/or some other example herein, wherein upon collecting the resource usage metrics, Ceilometer compute agent sends the resource usage metrics to Ceilometer notification agent.

Additional Example 8 may include the apparatus of Additional Examples 5, 7 and/or some other example herein, wherein Ceilometer notification agent, comprising one or more processors, is to: receive the resource usage metrics from Ceilometer compute agent; and use the cpu util measurement to create the Virtual CPU usage metric, and send the Virtual CPU usage metric to VIM; and use the network.incoming.bytes measurement to create Network incoming bytes metric and send the Network incoming bytes metric to VIM; and use the network.outgoing.bytes measurement to create Network outgoing bytes metric and send the Network outgoing bytes metric to VIM; and use the network.incoming.packets measurement to create Network incoming packets metric and send the Network incoming packets metric to VIM; and use the network.outgoing.packets measurement to create Network outgoing packets metric and send the Network outgoing packets metric to VIM.

Additional Example 9 may include the apparatus of Additional Example 8 and/or some other example herein, wherein Ceilometer notification agent, comprising one or more processors, is to: invoke the pipeline processing that contains transformer to perform arithmetic calculations using the equation of memory_util=100*memory.usage/memory to produce the memory_util measurement that is the percentage of memory usage by a VM instance in a polling interval; and invoke the pipeline processing that contains transformer to perform arithmetic calculations using the equation of disk_util=100*disk.usage/disk.allocation to produce the disk_util measurement that is the percentage of disk usage by a VM instance in a polling interval; use memory_util measurement to create memory usage metric, and send the memory usage metric to VIM; and use disk_util measurement to create disk usage metric, and send the disk usage metric to VIM.

Additional Example 10 may include the Virtualized Infrastructure Manager (VIM) comprising one or more processors to: receive the resource usage metrics from NFVI; perform processing of the resource usage metrics that were received within a collection period; generate the virtualized resource usage measurement for a Virtualised Compute Resource from the processing of resource usage metrics; and report for the virtualized resource usage measurement to Virtualised Network Function Manager (VNFM).

Additional Example 11 may include the method according to Additional Example 10 and/or some other Additional Example herein, wherein upon receiving the resource usage metrics from NFVI, VIM is to: perform the arithmetic mean of the Virtual CPU usage metrics that were received within a collection period to generate the mean virtual CPU usage measurement; and perform the arithmetic mean of the memory usage metrics that were received within a collection period to generate the mean memory usage measurement; and perform the arithmetic mean of the disk usage metrics that were received within a collection period to generate the mean disk usage measurement; and select the maximum metric among the Virtual CPU usage metrics that were received within a collection period to generate the peak virtual CPU usage measurement; and select the maximum metric among the memory usage metrics that were received within a collection period to generate the peak memory usage measurement; and select the maximum metric among the disk usage metrics that were received within a collection period to generate the peak disk usage measurement.

Additional Example 12 may include the method according to Additional Example 10 and/or some other Additional Example herein, wherein upon receiving the resource usage metrics from NFVI, VIM is to: generate the number of incoming bytes on networking resource measurement that contain the content of the network.incoming.bytes measurement received from NFVI; and generate the number of outgoing bytes on networking resource measurement that contain the content of the network.outgoing.bytes measurement received from NFVI; and generate the number of incoming packets on networking resource measurement that contain the content of the network.incoming.packets measurement received from NFVI; and generate the number of outgoing packets on networking resource measurement that contain the content of the network.outgoing.packets measurement received from NFVI.

Additional Example 13 may include an apparatus comprising means to perform one or more elements of a method described in or related to any of Additional Examples 1-12, or any other method or process described herein.

Additional Example 14 may include one or more non-transitory computer-readable media comprising instructions to cause an electronic device, upon execution of the instructions by one or more processors of the electronic device, to perform one or more elements of a method described in or related to any of Additional Examples 1-12, or any other method or process described herein.

Additional Example 15 may include an apparatus comprising logic, modules, and/or circuitry to perform one or more elements of a method described in or related to any of Additional Examples 1-12, or any other method or process described herein.

Example 16 may include a method, technique, or process as described in or related to any of Additional Examples 1-12, or portions or parts thereof Additional Example 17 may include an apparatus comprising: one or more processors and one or more computer readable media comprising instructions that, when executed by the one or more processors, cause the one or more processors to perform the method, techniques, or process as described in or related to any of Additional Examples 1-12, or portions thereof.

Additional Example 18 may include a method of communicating in a wireless network as shown and described herein.

Additional Example 19 may include a system for providing wireless communication as shown and described herein.

Additional Example 20 may include a device for providing wireless communication as shown and described herein.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus for a network function virtualization infrastructure (NFVI), comprising:
a first interface coupled to a virtualized infrastructure manager (VIM);
a second interface coupled to a system configured to provide measurements of a virtualized compute resource of a virtual machine (VM) instance associated with the NFVI; and
a processor coupled to the first interface and the second interface, the processor configured to:
receive resource usage data of the VM instance from an agent executing on a compute node of the system, the resource usage data covering at least a collection period;

process the resource usage data of the VM instance;
compute a set of virtual resource usage metrics for the collection period based at least in part on the resource usage data; and
generate the set of virtual resource usage metrics from the NFVI for transmission to the VIM, the set of virtual resource usage metrics covering at least the collection period.

2. The apparatus of claim 1, wherein the resource usage data comprises status counter metrics to measure a set of discrete events with fluctuating values at a set of intervals.

3. The apparatus of claim 2, wherein the status counter metrics further comprise an arithmetic mean value of virtual resource usage or peak value of virtual resource usage.

4. The apparatus of claim 1, wherein the resource usage data comprises transparent forwarding of content of virtual resource usage of the VM instance as measured.

5. The apparatus of claim 4, wherein the set of virtual resource usage metrics comprises:
a number of incoming bytes on virtual compute that includes a number of bytes the VM instance receives;
a number of outgoing bytes on virtual compute that includes a number of bytes the VM instance transmits;
a number of incoming packets on virtual compute that includes a number of packets the VM instance receives; or
a number of outgoing packets on virtual compute that includes a number of packets the VM instance transmits.

6. The apparatus of claim 1, wherein the set of virtual resource usage metrics comprises mean virtual central processing unit (CPU) usage, peak virtual CPU usage, mean memory usage, peak memory usage, mean disk usage, or peak disk usage.

7. The apparatus of claim 1, wherein the resource usage data is a gauge measurement of discrete events at a set of intervals.

8. The apparatus of claim 1, wherein the resource usage data is a cumulative measurement that measures a number of events in a polling interval.

9. A system for management of virtualized resources comprising:
a compute node configured to execute a hypervisor and one or more virtual machines, the compute node further configured to periodically collect resource usage data of the one or more virtual machines and provide the resource usage data to a network function virtualization infrastructure (NFVI);
the NFVI configured to:
process resource usage data of a virtual machine (VM) instance associated with the NFVI, the resource usage data covering at least a collection period;
compute a set of virtual resource usage metrics for the collection period based at least in part on the resource usage data; and
generate the set of virtual resource usage metrics from the NFVI for transmission to a virtualized infrastructure manager (VIM), the set of virtual resource usage metrics covering at least the collection period;
the VIM configured to:
process the set of virtual resource usage metrics from the NFVI; and
generate a virtual resource usage measurement for a virtualized compute resource based at least in part on the set of virtual resource usage metrics;
wherein the compute node is further configured to execute a compute agent to poll the hypervisor periodically to collect the resource usage data of the VM instance within a deployment.

10. The system of claim 9, wherein the resource usage data further comprises an instance identifier of a VM instance, the instance identifier identifying at least a subset of the resource usage data that is associated with the VM instance.

11. The system of claim 9, wherein at least a subset of the resource usage data is converted to a percentage of a virtual resource in use for the set of virtual resource usage metrics.

12. The system of claim 9, wherein the set of virtual resource usage metrics comprises mean virtual central processing unit (CPU) usage, peak virtual CPU usage, mean memory usage, peak memory usage, mean disk usage, peak disk usage, number of incoming bytes, number of outgoing bytes, number of incoming packets, or number of outgoing packets.

13. The system of claim 9, wherein to generate mean virtual central processing unit (CPU) usage, mean memory usage, or mean disk usage in a collection interval, the VIM is configured to:
receive the set of virtual resource usage metrics from NFVI at a pre-defined interval; and
take an arithmetic mean of the set of virtual resource usage metrics received during the collection interval.

14. The system of claim 9, wherein to generate peak virtual central processing unit (CPU) usage, peak memory usage, or peak disk usage in a collection interval, VIM is configured to:
receive the set of virtual resource usage metrics from NFVI at a pre-defined interval; and
select a maximum metric among the set of virtual resource usage metrics received during the collection interval.

15. The system of claim 9, wherein the resource usage data is a cumulative measurement of events in an interval or a measurement of discrete events.

16. The system of claim 9, wherein the VIM is further configured to report the virtual resource usage measurement for the virtualized compute resource to a virtualised network function manager (VNFM).

17. The system of claim 9, wherein the VIM generates the virtual resource usage measurement by receiving the set of virtual resource usage metrics in a set of polling intervals, and transparently forwards them to a virtual network functions manager (VNFM).

18. A method of managing network function virtualization infrastructure (NFVI), the method comprising:
processing resource usage data of a virtual machine (VM) instance managed by the NFVI, the resource usage data covering at least a collection period;
converting the resource usage data to a set of virtual resource usage metrics for the collection period; and
generating the set of virtual resource usage metrics from the NFVI for transmission to a virtualized infrastructure manager (VIM), the set of virtual resource usage metrics covering at least the collection period;
wherein processing resource usage data of the VM instance managed by the NFVI further comprises processing a set of messages from an agent executing on a compute node that collects the resource usage data from a hypervisor executing on the compute node.

19. The method of claim 18, wherein converting the resource usage data further comprises preparing an arithmetic mean of a subset of the resource usage data or selecting a maximum value of the subset of the resource usage data to form a virtual processor usage metric.

20. The method of claim 18, wherein the set of virtual resource usage metrics comprises mean virtual central processing unit (CPU) usage, peak virtual CPU usage, mean memory usage, peak memory usage, mean disk usage, peak disk usage, number of incoming bytes, number of outgoing bytes, number of incoming packets, or number of outgoing packets.

* * * * *